(12) United States Patent
Sadatoshi et al.

(10) Patent No.: US 6,451,936 B1
(45) Date of Patent: Sep. 17, 2002

(54) POLYPROPYLENE RANDOM COPOLYMER AND FILM THEREOF

(75) Inventors: Hajime Sadatoshi; Seiichiro Ima; Kazuki Wakamatsu, all of Chiba (JP); Jiro Mori, Singapore (SG); Eisuke Shiratani, Chiba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 08/465,515

(22) Filed: Jun. 5, 1995

Related U.S. Application Data

(63) Continuation of application No. 08/078,647, filed on Jun. 21, 1993, now abandoned.

(30) Foreign Application Priority Data

Jun. 30, 1992 (JP) ............................................. 4-172463

(51) Int. Cl.$^7$ .................................................. C08F 4/58
(52) U.S. Cl. .................... 526/125.3; 526/118; 526/119; 526/128; 526/348.1; 526/348.6
(58) Field of Search ................................ 526/118, 119, 526/125.3, 128, 348.1, 348.6

(56) References Cited

U.S. PATENT DOCUMENTS

| | | | | |
|---|---|---|---|---|
| 4,161,574 A | | 7/1979 | Strametz et al. ............ | 526/159 |
| 4,230,767 A | * | 10/1980 | Isaka et al. ................ | 428/349 |
| 4,291,140 A | * | 9/1981 | Fujii et al. ................. | 525/321 |
| 4,367,322 A | * | 1/1983 | Shiga et al. ................ | 526/137 |
| 4,675,247 A | | 6/1987 | Kitamura et al. ........... | 428/349 |
| 4,761,462 A | * | 8/1988 | Kitamura et al. ........... | 526/159 |
| 5,023,223 A | * | 6/1991 | Ebara et al. ................ | 502/116 |
| 5,143,880 A | * | 9/1992 | Sasaki et al. ............... | 502/112 |

FOREIGN PATENT DOCUMENTS

| | | | |
|---|---|---|---|
| EP | 0426139 | * | 5/1991 |
| FR | 2428651 | | 1/1980 |
| GB | 2105651 | * | 3/1983 |

* cited by examiner

*Primary Examiner*—David W. Wu
*Assistant Examiner*—Ling-Siu Choi
(74) *Attorney, Agent, or Firm*—Sughrue Mion, PLLC

(57) ABSTRACT

A polypropylene random copolymer obtained by copolymerizing propylene and an α-olefin or propylene, ethylene, and α-olefin using a Ziegler-Natta catalyst substantially in the absence of solvent, wherein propylene content is from 92.3 to 75.0% by weight, the ethylene content (E) is from 0 to 2.7% by weight, and the α-olefin content is from 5.0 to 25.0% by weight, and wherein the content (C) of 20° C. xylene-soluble components in the random copolymer satisfies following formulae (1) to (3);

in the copolymer wherein the ethylene content (E) is less than 1.5% by weight, $$C \leq 12.0 \text{ (weight \%)} \tag{1}$$

in the copolymer wherein the ethylene content (E) is from 1.5% by weight to 1.8% by weight, $$C \leq 42.0 - 20.0 \times E \text{ (weight \%)} \tag{2}$$

and in the copolymer wherein the ethylene content (E) is from 1.8% by weight to 2.7% by weight, $$C \leq 6.0 \text{ (weight \%)} \tag{3}$$

13 Claims, 1 Drawing Sheet

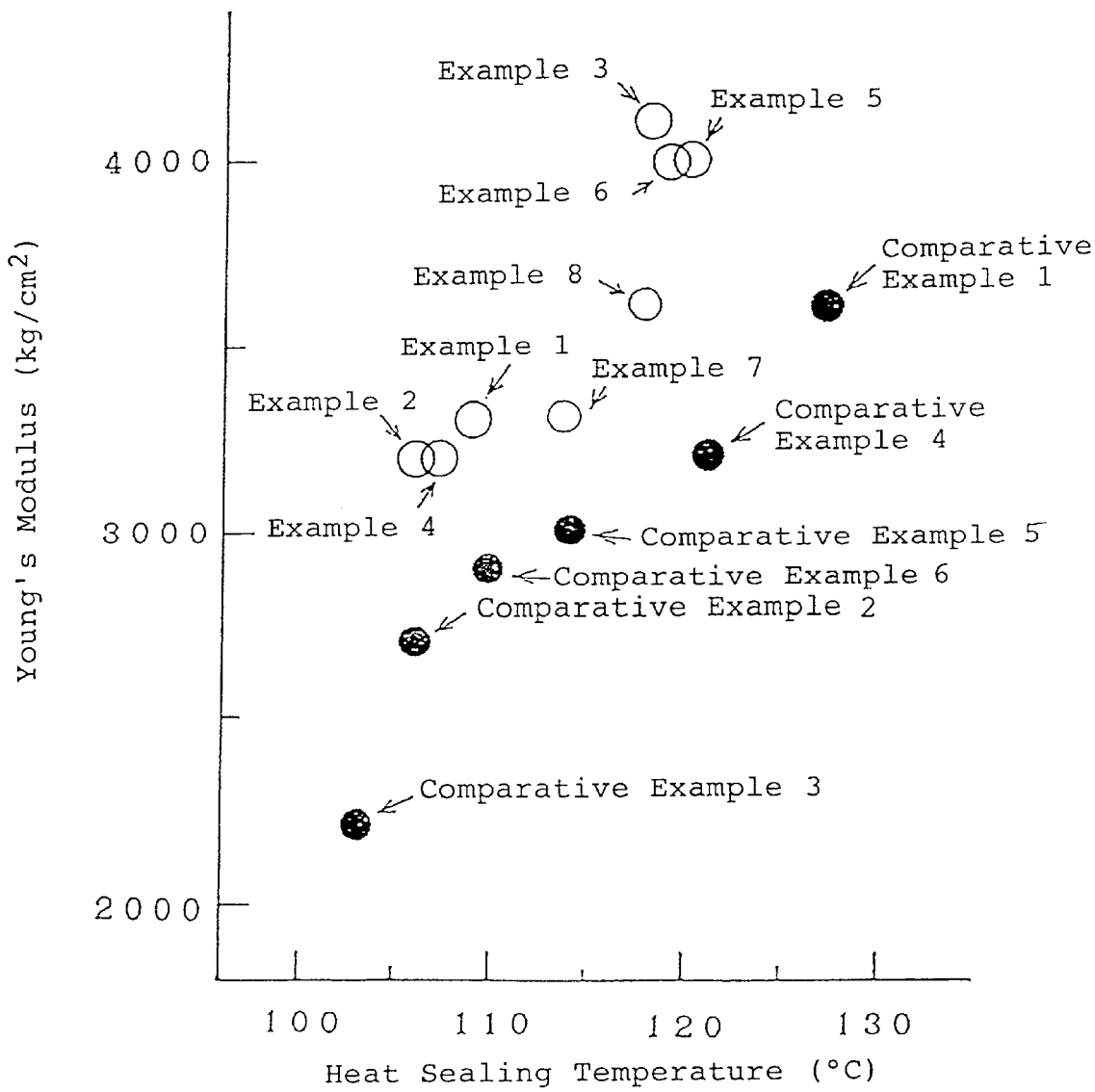
FIG.

POLYPROPYLENE RANDOM COPOLYMER AND FILM THEREOF

This is a continuation of application Ser. No. 08/078,647 filed Jun. 21, 1993 now abandoned.

FIELD OF THE INVENTION

The present invention relates to a polypropylene random copolymer and a film thereof. More particularly, the invention relates to a polypropylene random copolymer and a film thereof excellent in an appearance and excellent in balance of low-temperature heat-sealing property and rigidity.

BACKGROUND OF THE INVENTION

Since a polypropylene film is excellent in appearance, heat-seal characteristics, heat resistance, rigidity, etc., the film has been widely used in a packaging field such as food packaging, fiber packaging, etc.

Recently, for improving productivity in the packaging field, production speed at a bag-making or packaging has been increased and for this purpose, development of materials excellent in higher speed bag-making property and packaging property and showing a good sealing property at low temperature has been desired. Thus, various investigations have been made to improve the heat sealing property at low temperature, and a method of compounding various kinds of low-crystalline ethylene-propylene copolymers with a polypropylene random copolymer and a method of increasing content of ethylene and/or an α-olefin in a polypropylene random copolymer have been attempted. However, those products obtained are yet insufficient in the point of a polypropylene random copolymer and the film thereof excellent in appearance and also excellent in a balance of low-temperature heat sealing property and rigidity. That is, if the amount of the low-crystalline polypropylene random copolymer compounded or the content of the comonomer such as ethylene, etc., in a random copolymer is increased to attain the low-temperature heat-sealing property, the rigidity thereof is greatly decreased or a phenomenon such as a poor appearance by whitening due to bleeding occurs, whereby the desired object cannot be attained.

A solution polymerization method or a bulk polymerization method has been known as the production method of a polypropylene random copolymer.

In those polymerization methods, since the copolymerization or the post treatment of the copolymer is conducted in a solvent such as heptane, hexane, etc., or a mixed medium of propylene, an α-olefin and/or ethylene, low-molecular weight polymer components giving influences on the blocking resistance, whitening property by bleeding, etc., are dissolved and removed to give preferred characteristics.

However, on the other hand, problems occur that the colopolymer components effective for the heat sealing property at low temperature are dissolved and removed and if the content of the comonomer such as an α-olefin and/or ethylene is intended to increase, the copolymer itself is dissolved and thus cannot be produced. For those reasons, if it is intended to obtain a material capable of heat sealing at lower temperature by those polymerization methods, there is a large restriction and the production of such a copolymer by an industrially useful method has not substantially been attained.

Thus, for the purpose of attaining the above object, it has been attempted to produce the copolymer by a so-called gas-phase polymerization method in which a solvent or an active monomer liquid is not substantially present.

Methods described in JP-A-60-166455, JP-A-53-26882, etc., (the term "JP-A" as described herein means an "unexamined published Japanese patent application") are known as this method, but in the point to obtain the polypropylene random copolymer and the film thereof excellent in the appearance and also excellent in the balance of the low-temperature heat sealing property and the rigidity, the products obtained are yet insufficient.

SUMMARY OF THE INVENTION

Accordingly, an object of the present invention is to provide a polypropylene random copolymer and a film thereof excellent in appearance and also excellent in the balance of the low-temperature heat sealing property and the rigidity without deterioration of the transparency which is the preferred characteristic the film of polypropylene inherently possesses.

As a result of various investigations to develop a polypropylene random copolymer and film thereof excellent in appearance and also excellent in the balance of the low-temperature heat sealing property and the rigidity without deterioration of the transparency which is the characteristic the film of polypropylene inherently possesses, which have not been obtained by the above-described conventional techniques, the inventors have found that the above object can be attained by a polypropylene random copolymer wherein the copolymer compositions are in specific ranges and the contents of 20° C. xylene-soluble components are in specific ranges. The present invention has been accomplished based on this finding.

That is, according to one embodiment of the present invention, there is provided a polypropylene random copolymer obtained by copolymerizing propylene and an α-olefin, or propylene, ethylene, and an α-olefin substantially in the absence of a solvent using a Ziegler-Natta catalyst, wherein the propylene content is from 92.3 to 75.0% by weight and, ethylene content (E) is from 0 to 2.7% by weight, and the α-olefin content is from 5.0 to 25.0% by weight, and wherein the content (C) of 20° C. xylene-soluble components in the random copolymer satisfies the following formulae (1) to (3);

in the copolymer wherein the ethylene content (E) is less than 1.5% by weight, $$C \leq 12.0 \text{ (weight \%)} \quad (1)$$

in the copolymer wherein the ethylene content (E) is from 1.5% by weight to 1.8% by weight, $$C \leq 42.0 - 20.0 \times E \text{ (weight \%)} \quad (2)$$

and in the copolymer wherein the ethylene content (E) is from 1.8% by weight to 2.7% by weight, $$C \leq 6.0 \text{ (weight \%)} \quad (3).$$

According to another embodiment of the present invention, there is provided a polypropylene film formed by melt-extruding the above-described polypropylene random copolymer.

BRIEF DESCRIPTION OF THE DRAWING

The FIGURE is a graph showing the balance of the heat sealing temperature and the Young's modulus of each of the films obtained in the Examples of the present invention in comparison with each of the films obtained in the Comparative Examples.

DETAILED DESCRIPTION OF THE INVENTION

The present invention is described in detail below.

If any one of the propylene content, the ethylene content, the α-olefin content and the content of 20° C. xylene-soluble components in polypropylene random copolymer is outside the above-described range defined in the present invention, the polypropylene random copolymer and the film thereof excellent in appearance and also excellent in the balance of the low-temperature heat sealing property and the rigidity, which are the object of the present invention, cannot be attained.

If the propylene content in the polypropylene random copolymer is over 92.3% by weight, the low-temperature heat sealing property is inferior, while the content is less than 75.0% by weight, the heat resistance and the rigidity of the copolymer are poor. If the ethylene content is over 2.7% by weight, the problems occur that the balance of the low-temperature heat sealing property and the rigidity is poor and the appearance becomes poor by whitening due to bleeding. Also, if the content of the α-olefin is less than 5.0% by weight, the low-temperature heat sealing propety is poor, while the content thereof is over 25.0% by weight, the rigidity and the heat resistance are poor.

Furthermore, even if the propylene content, the ethylene content, and the α-olefin content are in the above-described ranges, it is important in the present invention that the content (C) of the 20° C. xylene-soluble components in the polypropylene random copolymer is 12.0% by weight or less in the copolymer that the ethylene content is less than 1.5% by weight, satisfies the following formula $$C \leq 42.0 - 20.0 \times E \text{ (weight \%)} \quad (2)$$

in the copolymer in which the ethylene content (E) is from 1.5% by weight to 1.8% by weight, and is 6.0% by weight or less in the copolymer in which the ethylene content is from 1.8% by weight to 2.7% by weight. If the content of the 20° C. xylene-soluble components is over the above-described range, the copolymer and the film thereof are poor in the points of the appearance by whitening due to bleeding and of the rigidity.

As the polypropylene random copolymer of the present invention, it is preferred that the propylene content is from 92.5 to 78.0% by weight, the ethylene content is from 0 to 2.5% by weight, and the α-olefin content is from 5.0 to 22.0% by weight. Also, the preferred range of the content (C) of the 20° C. xylene-soluble components in the polypropylene random copolymer of the present invention is 11.0% by weight or less in the copolymer that the ethylene content is less than 1.5% by weight, satisfies the following formula $$C \leq 43.5 - 21.7 \times E \text{ (weight \%)} \quad (2a)$$

in the copolymer in which the ethylene content (E) is from 1.5% by weight to 1.8% by weight, and is 4.5% by weight or less in the copolymer in which the ethylene content is from 1.8 to 2.7% by weight.

As the α-olefin for the polypropylene random copolymer of the present invention, an α-olefin having from 4 to 10 carbon atoms can be used, and butene-1 is preferably used.

The polypropylene random copolymer has a melt flow rate of from 1 to 50 g/10 min, preferably from 2 to 30 g/10 min, and more preferably from 3 to 20 g/10 min, from the standpoints of the transparency and the high-speed workability in the production of the film.

Further, the polypropylene random copolymer used generally has an intrinsic viscosity of from 1 to 3 dl/g measured at 135° C. in tetralin.

For the production of the polypropylene random copolymer of the present invention, a Ziegler-Natta catalyst containing at least titanium, magnesium, and a halogen as essential components is used.

That is, the polypropylene random copolymer of the present invention can be produced by a process comprising copolymerizing a mixture of propylene and an α-olefin or a mixture of propylene, ethylene, and an α-olefin by a gas phase polymerization method using a catalyst system comprising (A) solid catalyst components comprising magnesium, titanium, and a halogen as the essential components, (B) an organoaluminum compound, and (C) a silicon compound represented by the formula $R^1R^2Si(OR^3)_2$ wherein $R^1$ represents an alicyclic hydrocarbon group having from 5 to 20 carbon atoms and $R^2$ and $R^3$ each represents a hydrocarbon group having from 1 to 20 carbon atoms.

The solid catalyst components (A) contain titanium, magnesium, and a halogen as the essential components and are generally obtained by treating with an ester compound a solid product obtained by reducing a titanium compound with an organomagnesium compound, and then treating the treated product with titanium tetrachloride.

The titanium compound used to produce the solid catalyst components (A) is represented by the formula $Ti(OR)_bX_{4-b}$ wherein R represents a hydrocarbon group having from 1 to 20 carbon atoms, X represents a halogen atom, and b is a number of $0<b\leq 4$.

Examples of R are an alkyl group such as methyl, ethyl, propyl, iso-propyl, butyl, iso-butyl, amyl, iso-amyl, hexyl, heptyl, octyl, decyl, dodecyl, etc.; an aryl group such as phenyl, cresyl, xylyl, naphthyl, etc.; a cycloalkyl group such as cyclohexyl, cyclopentyl, etc.; an allyl group such as propenyl, etc.; and an aralkyl group such as benzyl, etc.

An optional type organomagnesium compound having a magnesium-carbon bond can be used as the magnesium component. In particular, the Grignard compound represented by the formula RMgX wherein R represents a hydrocarbon group having from 1 to 20 carbon atoms and X represents a halogen atom, and the magnesium compound represented by the formula RR'Mg wherein R and R', which may be the same or different, each represents a hydrocarbon group having from 1 to 20 carbon atoms are preferably used.

Examples of the Grignard compound are methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, iso-amylmagnesium chloride, phenylmagnesium chloride, phenylmagnesium bromide, etc. Also, Examples of the magnesium compound represented by RR'Mg are diethylmagnesium, dipropylmagnesium, di-isopropylmagnesium, dibutymagnesium, di-sec-butylmagnesium, di-tert-butylmagnesium, butyl-sec-butylmagnesium, diamylmagnesium, diphenylmagnesium, etc.

The organoaluminum compound (B) which is used in combination with the solid catalyst component (A) has at least one Al-carbon bond in the molecule.

Examples of the organoaluminum compound are a trialkylaluminum such as triethylaluminum, triisobutylaluminum, trihexylaluminum, etc.; a dialkylaluminum halide such as diethylaluminum halide, diisobutylalumuinum halide, etc.; a mixture of the trialkylaluminum and the dialkylaluminum halide; and an alkylaluminoxane such as tetraethyldialuminoxane, tetrabutyldialuminoxane, etc.

In those organoaluminum compounds, the trialkylaluminum, a mixture of the trialkylaluminum and the dialkylaluminum halide, and the alkylaluminoxane are preferred, and triethylaluminum, triisobutylaluminum, a mixture of triethylaluminum and diethylaluminum chloride, and tetraethyldialuminoxane are more preferred.

The amount of the organoaluminum compound used can be selected in a wide range of from 1 to 1,000 moles per mole of the titanium atom in the solid catalyst, and is particularly preferably selected in the range of from 5 to 600 moles.

The silicon compound (C) represented by the formula $R^1R^2Si(OR^3)_2$, which is an electron donor, is a silicon compound having an alicyclic hydrocarbon group, and the examples thereof are compounds represented by the formulae:

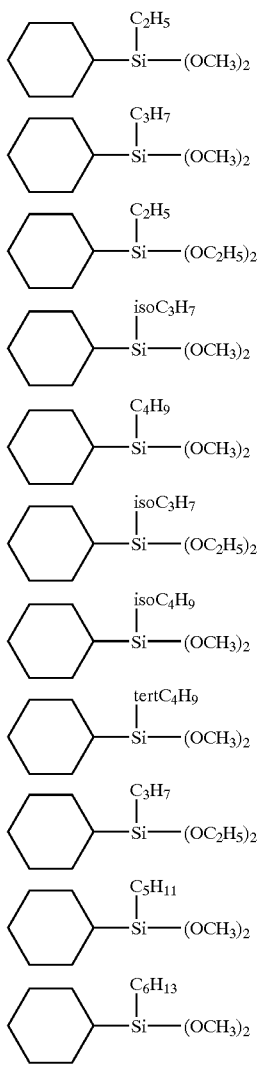

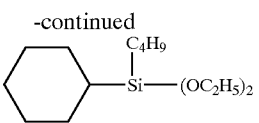

The catalyst is used such that the molar ratio of the Al atom in component (B)/the Ti atom in component (A) becomes from 1:1 to 1,000:1, and preferably from 5:1 to 600:1, and the molar ratio of the component (C)/the Al atom in component (B) 5 becomes from 0.02:1 to 500:1, and preferably from 0.05:1 to 10:1. The polymerization is conducted at a polymerization temperature of from 20 to 150° C., and preferably from 50 to 95° C. and at a polymerization pressure of from atmospheric pressure to 40 kg/cm²G, and preferably from 2 to 30 kg/cm²G, substantially in the absence of a solvent while applying propylene, ethylene, and an α-olefin together with hydrogen for controlling the molecular weight of a copolymer formed.

The copolymer of the present invention is melt-extruded to form a film. As a result, a film having no whitening due to bleeding (Δ haze: 0.5% or less), a heat sealing temperature of 120° C. or less, and a Young's modulus of at least 3,000 kg/cm², and also having excellent appearance and balance of the low-temperature heat sealing property and the rigidity can be obtained.

The film of the present invention is an unstretched film having a thickness in the range of from 10 to 500 μm, and preferably from 10 to 100 μm.

Also, since the film formed from the copolymer of the present invention has the preferred characteristics described above, the film is preferably used as at least one layer component at the production of multilayer films by a co-extrusion film-forming method.

There is no particular restriction on the production method of the polypropylene film of the present invention if the method is usually industrially used. For example, a method for producing a plypropylene film by a melt extrusion molding method such as a T-die film-forming method, a tubular film-forming method, etc., but a T-die film-forming method wherein a high-speed film-formation is practiced by a large-scale film-forming machine is preferably used.

The polypropylene random copolymer and the film thereof of the present invention can be, if necessary, compounded with an antioxidant, a neutralizing agent, a lubricant, an antiblocking agent, an antistatic agent, etc., which are ordinary used in the field of the art.

The present invention is described in more detail by reference to the following Examples and Comparative Examples, which should not be construed as limiting the scope of the invention.

In addition, the measured value of each item in the specification and the examples of the invention was measured by the following method.

(1) Ethylene content and butene-1 content:

Ethylene content: The ethylene content was determined by the IR spectral method described in *Koobunshi Bunseki (Polymer Molecule Analysis) Handbook*, page 256 [(i) Random Copolymer], published by Asakura Shoten, 1985.

Butene-1 content: The butene-1 content was determined by the following equation by the IR spectral method.

Butene-1 content (weight %)=1.208K' wherein K' is the absorbance at 767 cm$^{-1}$.

(2) Melt flow rate (MFR):

Measured by the method of condition-14 according to JIS K7210.

(3) 20° C. Xylene-soluble components:

After completely dissolving 1 g of each sample in 100 ml of boiling xylene, the temperature of the solution was lowered to 20° C. and the solution was allowed to stand for 4 hours. Thereafter, precipitates formed were filtered away and the filtrate obtained was evaporated in dryness and dried at 70° C. under reduced pressure. The weight of the residue was measured to determine the content as weight %.

(4) Transparency (haze):

Measured according to JIS K7105.

(5) Whitening due to bleeding (Δhaze):

The haze after heat treating each sample at 60° C. for 24 hours and the haze thereof before the heat treatment were measured and the difference thereof was defined as Δ haze.

(6) Heat sealing temperature:

Sealed films of 25 mm in width obtained by pressing superposed films by means of a heated heat sealer for 2 seconds by applying a load of 2 kg/cm$^2$ were allowed to stand overnight and thereafter the films were peeled off from each other at 23° C., at a peeling speed of 200 mm/minute, and at a peeling angle of 180°. In this case, the temperature of the heat sealer when the peeling resistance became 300 g/25 mm was employed as the heat sealing temperature.

(7) Young's modulus:

Each test sample of 20 mm in width was sampled from the lengthwise direction (MD), an S—S curve was determined by a tension tester at a chuck interval of 60 mm and a tensile speed of 5 mm/min., and the initial elastic modulus was measured.

REFERENCE EXAMPLE (a) Synthesis of Organomagnesium Compound

After replacing the atmosphere in one liter flask equipped with a stirrer, a refluxing condenser, a dropping funnel, and a thermometer with argon, 32.0 g of shaved magnesium for a Grignard reagent was placed in the flask. Then, 120 g of butyl chloride and 500 ml of dibutyl ether were charged in the dropping funnel and about 30 ml of the mixture was dropped to magnesium in the flask to initiate the reaction. After initiation of the reaction, dropping of the mixture was continued at 50° C. for 4 hours and after completion of the dropping, the reaction was further continued at 60° C. for one hour. The reaction mixture was cooled to room temperature and solid components formed were separated by filtration.

Butylmagnesium chloride in dibutyl ether was hydrolyzed with 1N sulfuric acid and the concentration of the organomagnesium compound formed was determined by a back titration with an aqueous solution of 1N sodium hydroxide using phenolphthalein as an indicator. As a result, the concentration was 2.1 mols/liter.

(b) Synthesis of Solid Product

After replacing the inside atmosphere of a 500 ml flask equipped with a stirrer and a dropping funnel with argon, 240 ml of hexane, 5.4 g (15.8 mmols) of tetrabutoxytitanium, and 61.4 g (295 mmols) of tetraethoxysilane were placed in the flask to form a homogeneous solution. Then, 150 ml of the organic magnesium synthesized in the above step (a) was gradually added dropwise to the solution from the dropping funnel over a period of 4 hours while maintaining the inside temperature of the flask at 5° C. Thereafter, the resulting mixture was further stirred at room temperature for one hour and solids formed were separated from liquid at room temperature, washed repeatedly three times with 240 ml of hexane, and dried under a reduced pressure to obtain 45.0 g of a light-brown solid product.

The solid product obtained contained 1.7% by weight of a titanium atom, 33.8% by weight of an ethoxy group, and 2.9% by weight of butoxy group.

Also, in a wide angle X ray diffraction diagram of the solid product by Cu-Ka line, no clear diffraction peaks were observed, which showed that the solid product had a non-crystalline structure.

(c) Synthesis of Ester-treated Solid

After replacing the inside atmosphere of a 100 ml flask with argon, 6.5 g of the solid product synthesized in the above step (b), 16.2 ml of toluene, and 4.3 ml (16 mmols) of diisobutyl phthalate were placed in the flask and the reaction was conducted at 95° C. for one hour.

After completion of the reaction, a solid product was separated from the reaction mixture and was washed three times with 33 ml of toluene.

(d) Synthesis of Solid Catalyst (Activation Treatment)

After completion of washing in the above step (c), 16.2 ml of toluene, 0.36 ml (1.3 mmols) of diisobutyl phthalate, 2.2 ml (13 mmols) of dibutyl ether, and 38.0 ml (346 mmols) of titanium tetrachloride were added into the flask and the reaction was conducted at 95° C. for 3 hours. After the reaction was completed, solids formed were separated from the liquid at 95° C. and were washed twice with 33 ml of toluene at the same temperature. Then, the treatment with the mixture of diisobutyl phthalate, dibutyl ether, and titanium tetrachloride described above was further repeated once under the same condition and the solid product was washed three times with 33 ml of hexane to obtain 5.0 g of a loess-color solid catalyst.

The solid catalyst obtained contained 2.1% by weight of a titanium atom, 19.9% by weight of a magnesium atom, and 12.7% by weight of a phthalic acid ester.

EXAMPLE 1

(a) Catalyst Component

In a 250 liter reaction vessel equipped with a stirrer was placed 150 liters of sufficiently purified hexane and after sufficiently replacing the inside atmosphere of the vessel with nitrogen, 3.2 mols of triethylaluminum (TEA), 0.32 mol of cyclohexylethyldimethoxysilane (CHEDMS), and the solid catalyst obtained in the Reference Example described above in an amount of 51.8 g calculated as the titanium atom were added to the reaction vessel. Then, 2.8 kg of propylene was continuously added thereto over a period of 2 hours while maintaining the temperature at 25° C.

(b) Polymerization

The catalyst component prepared in above step (a) was supplied to a 1,000 liter polymerization bath such that the polymerization temperature became 70° C., the polymerization pressure became 14.5 kg/cm$^2$ G, and the average residence time became 6 hours, and while simultaneously supplying 50 mmols/hour of TEA and 5 mmols/hour of CHEDMS (Al/CHEDMS=10/1 molar ratio), propylene and butene-1 were continuously supplied at a H$_2$ concentration in the polymerization bath of 0.2% to conduct a gas-phase polymerization.

The copolymer obtained contained 79.9% by weight of propylene, 20.1% by weight of butene-1, and 4.0% by weight of 20° C. xylene-soluble components. To 100 parts by weight of the copolymer thus obtained were added 0.1 part by weight of calcium stearate, 0.1 part by weight of Sumirizer BHT, 0.10 part by weight of Irganox 1010, 0.10 part by weight of erucic amide, and 0.15 part by weight of a fine silica powder followed by mixing with a Henschel mixer, the resulting mixture was melt-extruded to form pellets. Then, the pellets obtained were melt-extruded by a T-die film-forming machibne of 50 mm in diameter at a die temperature of 250° C. and cooled by a cooling roller passing therethrough cooling water of 30° C. to obtain an unstretched film of 30 μm in thickness.

The transparency (haze), the whitening by bleeding (Δ haze), the heat sealing temperature, and the Young's modulus of the film obtained are shown in Table 2 below.

EXAMPLE 2

By following the same procedure as in Example 1 except that the polymerization temperature was changed to 65° C., the propylene-butene-1 copolymer shown in Table 1 below was obtained. The evaluations were made in the same manners as in Example 1. The evaluation results obtained are shown in Table 2 below.

EXAMPLE 3

Three polymerization baths having inside volumes of 20 to 45 $m^3$ were used and a gas-phase polymerization was conducted by continuously supplying propylene, ethylene, and butene-1 in the same manner as in Example 1 except that the polymerization temperature was 80° C., the polymerization pressure was from 7 to 15 kg/$cm^2$ G, and the hydrogen ($H_2$) concentration was 0.25%.

The copolymer obtained contained 88.6% by weight of propylene, 1.2% by weight of ethylene, 10.2% by weight of butene-1, and 3.1% by weight of 20° C. xylene-soluble components. The copolymer was evaluated in the same manner as in Example 1. The evaluation results obtained are shown in Table 2 below.

EXAMPLES 4 to 8

In Example 4, the same procedure as in Example 1 was followed except that the weight ratios of the monomers supplied to the polymerization bath and the $H_2$ concentration were changed, and in Examples 5 to 8, the same procedure as in Example 3 was followed except that the weight ratios of the monomers supplied to the polymerization baths and the $H_2$ concentration were changed. Also, the copolymers obtained were evaluated in the same manner as in Example 1. The analytical results of the copolymers obtained are shown in Table 1 and the evaluation results are shown in Table 2 below.

Comparative Example 1

A gas-phase polymerization of propylene and ethylene was conducted under the same conditions as in Example 3 and the copolymer obtained was evaluated in the same manner as in Example 3. The evaluation results obtained are shown in Table 2 below.

Comparative Example 2

Using the same polymerization baths as in Example 3, using the $TiCl_3$-type solid catalyst described in JP-B-3-46001 (the term "JP-B" as used herein means an "examined published Japanese patent application"), and combining diethylaluminum chloride and methyl methacrylate as an electron donor, a gas-phase polymerization of propylene and butene-1 was conducted at a polymerization temperature of 65° C., a polymerization pressure of from 6 to 12 kg/$cm^2$ G and a $H_2$ concentration of 1.5%. The analytical results of the copolymer obtained are shown in Table 1 below and the evaluation results thereof are shown in Table 2 below.

Comparative Examples 3 to 6

The same solid catalyst as used in Example 1 was used. In Comparative Examples 3, 4, and 6, using the same type of polymerization bath as used in Example 1, the same procedure as in Example 1 was followed except that the polymerization temperature was 80° C., phenyltrimethoxysilane was used as the component (c), and the phenyltrimethoxysilane was added in an amount of Al/(c)=6.7/1 (molar ratio). Also, in Comparative Example 5, the same procedure as in Example 3 was followed except that the polymerization temperature was 70° C., the polymerization pressure was from 12 to 18 kg/$cm^2$ G, and the amounts of propylene, ethylene, and butene-1 supplied to the polymerization baths were changed.

The copolymers obtained were evaluated in the same manner as in Example 3. The analytical results obtained of those copolymers are shown in Table 1 below and the evaluation results obtained of those copolymers are shown in Table 2 below.

TABLE 1

| | Random Copolymer | | | | | |
|---|---|---|---|---|---|---|
| | Propylene Content (wt %) | Ethylene Content (wt %) | α-Olefin Content (wt %) | 20° C. xylene-soluble Content (wt %) | Intrinsic Viscosity (dl/g) | MFR (g/10 min) |
| Example 1 | 79.9 | 0 | Butene-1 20.1 | 4.0 | 1.76 | 5.4 |
| Example 2 | 78.5 | 0 | Butene-1 21.5 | 5.5 | 1.78 | 5.1 |
| Example 3 | 88.6 | 1.2 | Butene-1 10.2 | 3.1 | 1.71 | 6.1 |
| Example 4 | 81.7 | 1.3 | Butene-1 17.0 | 11.0 | 1.59 | 11 |
| Example 5 | 91.0 | 1.9 | Butene-1 7.1 | 3.5 | 1.68 | 5.6 |
| Example 6 | 91.5 | 2.4 | Butene-1 6.1 | 4.1 | 1.74 | 5.0 |
| Example 7 | 84.9 | 1.6 | Butene-1 13.6 | 8.0 | 1.75 | 5.8 |
| Example 8 | 85.2 | 1.0 | Butene-1 13.8 | 7.4 | 1.68 | 6.0 |
| Comparative Example 1 | 95.3 | 4.7 | 0 | 6.9 | 1.83 | 4.3 |
| Comparative Example 2 | 77.3 | 0 | Butene-1 22.7 | 13.8 | 1.56 | 11 |
| Comparative Example 3 | 77.7 | 0.3 | Butene-1 22.0 | 17.0 | 1.76 | 5.8 |
| Comparative Example 4 | 88.2 | 1.8 | Butene-1 10.0 | 7.9 | 1.96 | 3.1 |
| Comparative Example 5 | 91.8 | 4.2 | Butene-1 4.0 | 6.8 | 1.68 | 6.7 |
| Comparative Example 6 | 84.9 | 2.0 | Butene-1 13.1 | 10.9 | 1.70 | 6.7 |

TABLE 2

| | Properties of Film | | | |
|---|---|---|---|---|
| | Haze (%) | Δ Haze (%) | Heat Sealing Temperature (° C.) | Young's Modulus (kg/cm²) |
| Example 1 | 1.2 | 0.3 | 109 | 3300 |
| Example 2 | 1.1 | 0.3 | 106 | 3200 |
| Example 3 | 2.3 | 0.2 | 118 | 4100 |
| Example 4 | 3.0 | 0.4 | 107 | 3200 |
| Example 5 | 2.2 | 0.2 | 120 | 4000 |
| Example 6 | 2.1 | 0.2 | 119 | 4000 |
| Example 7 | 1.7 | 0.5 | 114 | 3300 |
| Example 8 | 1.9 | 0.5 | 118 | 3600 |
| Comparative Example 1 | 2.3 | 1.7 | 127 | 3600 |
| Comparative Example 2 | 1.3 | 0.3 | 106 | 2700 |
| Comparative Example 3 | 1.3 | 0.7 | 103 | 2200 |
| Comparative Example 4 | 3.5 | 1.8 | 121 | 3200 |
| Comparative Example 5 | 1.1 | 0.7 | 114 | 3000 |
| Comparative Example 6 | 1.8 | 0.9 | 110 | 2900 |

It can be seen from the results shown in the Tables that when the compositions of the copolymers are outside the range of the present invention (Comparative Examples 1 and 5) or even when the compositions of the copolymers are in the range of the present invention but when the content of the 20° C. xylene-soluble components is outside the range of the present invention (Comparative Examples 2, 3, 4, and 6), occurrence of whitening due to bleeding is remarkable or the balance of the low-temperature heat sealing property and the rigidity is poor, and as a result, the objects of the present invention cannot be attained.

Also, the balance of the heat sealing temperature and the Young's modulus of each of the copolymer films obtained in the Examples of the present invention is the shown in the Figure of the accompanying drawing together with that of each of the copolymer films obtained in the Comparative Examples.

It can be seen from the results shown in the Figure that each of the films of the present invention has a very excellent balance of the heat sealing temperature and the Young's modulus as compared with the films of the Comparative Examples.

As described above, according to the present invention, the films of polypropylene random copolymers without deterioration of the appearance by whitening due to bleeding and very excellent in the balance of the low-heat sealing property and the rigidity can be obtained.

While the invention has been described in detail and with reference to specific embodiments thereof, it will be apparent to one skilled in the art that various changes and modifications can be made therein without departing from the spirits and scope thereof.

What is claimed is:

1. A method of producing a polypropylene random copolymer comprising the steps of:

copolymerizing propylene and an α-olefin or propylene, ethylene, and α-olefin using a Ziegler-Natta catalyst in a gaseous phase, wherein the propylene content is from 92.3 to 75.0% by weight, the ethylene content (E) is from 0 to 2.7% by weight, and the α-olefin content is from 5.0 to 25.0% by weight, and wherein the content (C) of 20° C. xylene-soluble components in the random copolymer satisfies formulae (1) to (3):

in the copolymer wherein the ethylene content (E) is less than 1.5% by weight, $$C \leq 12.0 \text{ (weight \%)} \tag{1}$$

in the copolymer wherein the ethylene content (E) is from 1.5% by weight to 1.8% by weight, $$C \leq 42.0 - 20.0 \times E \text{ (weight \%)} \tag{2}$$

and in the copolymer wherein the ethylene content (E) is from 1.8% by weight to 2.7% by weight, $$C \leq 6.0 \text{ (weight \%)} \tag{3};$$

and wherein the Ziegler-Natta catalyst is a catalyst system comprising:

(A) solid catalyst components comprising magnesium, titanium and a halogen, (B) an organoaluminum compound, and (C) a silicon compound represented by formula $R^1R^2Si(OR^3)_2$ wherein $R^1$ represents an alicyclic hydrocarbon group having 5 to 20 carbon atoms, and $R^2$ and $R^3$ each represent a hydrocarbon group having 1 to 20 carbon atoms.

2. A method of producing a polypropylene random copolymer as claimed in claim 1, wherein the propylene content is from 92.3 to 78.0% by weight, the ethylene content is from 0 to 2.5% by weight, and the α-olefin content is from 5.0 to 22.0% by weight.

3. A method of producing a polypropylene random copolymer as claimed in claim 1, wherein the content (C) of the 20° C. xylene-soluble components in the random copolymer is 11.0% by weight or less in the copolymer in which the ethylene content is less than 1.5% by weight, is an amount satisfying the equation of $C \leq 43.5 - 21.7 \times E$ (% by weight) in the copolymer in which the ethylene content (E) is from 1.5 to less than 1.8% by weight, and is 4.5% by weight or less in the copolymer in which the ethylene content is from 1.8 to 2.7% by weight.

4. A method of producing a polypropylene random copolymer as claimed in claim 1, wherein the α-olefin is an α-olefin having 4 to 10 carbon atoms.

5. A method of producing a polypropylene random copolymer as claimed in claim 4, wherein the α-olefin is butene-1.

6. A method of producing a polypropylene random copolymer as claimed in claim 1, wherein the copolymer has a melt flow rate of from 1 to 50 g/10 min.

7. A method of producing a polypropylene random copolymer as claimed in claim 1, wherein the solid catalyst component (A) is obtained by:

reducing a titanium compound with an organomagnesium compound to obtain a solid product, treating the solid product with an ester compound, and then treating the treated solid product with titanium tetrachloride.

8. A method of producing a polypropylene random copolymer as claimed in claim 1, wherein the organoaluminum compound (B) is a compound having at least one Al-carbon bond in the molecule.

9. A method of producing a polypropylene random copolymer as claimed in claim 1, wherein the Ziegler-Natta catalyst is used such that the molar ratio of the Al atom in component (B) to the Ti atom in component (A) is from 1:1 to 1,000:1, and the molar ratio of the Si atom in component (C) to the Al atom in component (B) is from 0.02:1 to 500:1.

10. A method of producing a polypropylene random copolymer as claimed in claim 1, wherein the copolymerization is conducted at a temperature of from 20 to 150° C. and a pressure of from atmospheric pressure to 40 kg/cm$^2$G.

11. A method of producing a polypropylene random copolymer as claimed in claim 1, wherein the copolymerization is conducted while supplying hydrogen.

12. A method of producing a polypropylene film comprising the step of:

melt-extruding the polypropylene random copolymer produced by the method claimed in claim 1.

13. A method of producing a polypropylene film as claimed in claim 12, wherein the film has a Δ haze of 0.5% or less, a heat sealing temperature of 120° C. or less, and a Young's modulus of from 3,000 to 4,100 kg/cm$^2$.

* * * * *